United States Patent
Werner et al.

(10) Patent No.: US 11,970,023 B2
(45) Date of Patent: Apr. 30, 2024

(54) VEHICLE WHEEL ARRANGEMENT AND METHOD FOR PRODUCING A VEHICLE WHEEL ARRANGEMENT

(71) Applicant: THYSSENKRUPP CARBON COMPONENTS GMBH, Wilsdruff STT Kesselsdorf (DE)

(72) Inventors: Jens Werner, Coswig (DE); Michael Dressler, Dresden (DE); Florian Franke, Dresden (DE); Christian Köhler, Dresden (DE); Michael Franke, Dresden (DE); Sandro Mäke, Dohma (DE); André Bartsch, Dresden (DE)

(73) Assignee: ACTION COMPOSITES GMBH, Ried Im Innkreis (AT)

( * ) Notice: Subject to any disclaimer, the term of this patent is extended or adjusted under 35 U.S.C. 154(b) by 996 days.

(21) Appl. No.: 16/760,322

(22) PCT Filed: Nov. 12, 2018

(86) PCT No.: PCT/DE2018/100917
§ 371 (c)(1),
(2) Date: Apr. 29, 2020

(87) PCT Pub. No.: WO2019/091518
PCT Pub. Date: May 16, 2019

(65) Prior Publication Data
US 2020/0353775 A1    Nov. 12, 2020

(30) Foreign Application Priority Data
Nov. 13, 2017 (DE) .................... 10 2017 126 636.4

(51) Int. Cl.
*B60B 3/12* (2006.01)
*B60B 3/14* (2006.01)
(Continued)

(52) U.S. Cl.
CPC .................. *B60B 3/12* (2013.01); *B60B 3/14* (2013.01); *B60B 5/00* (2013.01); *B60B 27/02* (2013.01);
(Continued)

(58) Field of Classification Search
CPC .... B60B 3/10; B60B 3/12; B60B 3/14; B60B 5/02; B60B 5/00; B60B 27/02; F16C 2326/02
See application file for complete search history.

(56) References Cited

U.S. PATENT DOCUMENTS 3,604,756 A * 9/1971 Gruber ...................... B60B 5/02
                                                   301/64.701
3,861,435 A * 1/1975 Vincent ................... B60B 19/00
                                                         152/5

(Continued)

FOREIGN PATENT DOCUMENTS

EP      0174190 A    3/1986
EP      2848426 A    3/2015
(Continued)

OTHER PUBLICATIONS

English Translation of International Search Report issued in PCT/DE2018/100917, dated Jan. 31, 2019.

*Primary Examiner* — Jason R Bellinger
(74) *Attorney, Agent, or Firm* — Heslin Rothenberg Farley & Mesiti P.C.

(57) ABSTRACT

A vehicle wheel arrangement includes a wheel with a wheel hub and a carrier element for mounting the wheel on a vehicle part and/or for arrangement of a power-transmitting unit. In a joined state of the vehicle wheel arrangement a joining portion of the wheel hub corresponds with a joining portion of the carrier element. In the joined state of the vehicle wheel arrangement, the wheel hub and the carrier element are connected to one another in form-fitting fashion (Continued)

at least in a circumferential direction of a wheel hub axis. The wheel hub includes, in a region of the joining portion, one or more fiber plies with fibers arranged unidirectionally in the circumferential direction of the wheel hub axis. Furthermore, a method can be used to produce a vehicle wheel arrangement having a wheel hub made of fiber-reinforced composite and a carrier element.

20 Claims, 10 Drawing Sheets

(51) Int. Cl.
*B60B 5/00* (2006.01)
*B60B 27/02* (2006.01)
*B60B 27/00* (2006.01)
*F16D 65/02* (2006.01)
*F16D 65/12* (2006.01)

(52) U.S. Cl.
CPC ....... *B60B 27/0026* (2013.01); *F16C 2326/02* (2013.01); *F16D 65/123* (2013.01); *F16D 2065/1384* (2013.01)

(56) References Cited

U.S. PATENT DOCUMENTS

| | | | | |
|---|---|---|---|---|
| 4,411,639 | A * | 10/1983 | Ruther | B60B 7/0013 |
| | | | | 474/169 |
| 5,018,795 | A * | 5/1991 | Engerand | B29D 99/0032 |
| | | | | 152/410 |
| 5,064,250 | A * | 11/1991 | Yashiro | B60B 3/082 |
| | | | | 301/55 |
| 5,733,015 | A * | 3/1998 | Demarest | B29C 65/565 |
| | | | | 301/5.307 |
| 9,469,156 | B2 * | 10/2016 | Bueter | B60B 25/16 |
| 9,475,341 | B2 * | 10/2016 | Hufenbach | B60B 3/14 |
| 10,112,436 | B2 * | 10/2018 | Denmead | B60B 3/16 |
| 10,189,301 | B2 * | 1/2019 | Werner | B60B 5/02 |
| 11,358,411 | B2 * | 6/2022 | Jaeger | F16D 65/0025 |
| 2013/0221731 | A1 * | 8/2013 | Hess | B29C 45/006 |
| | | | | 301/37.101 |
| 2022/0297472 | A1 * | 9/2022 | Hsiao | B60B 3/04 |

FOREIGN PATENT DOCUMENTS

| | | |
|---|---|---|
| EP | 2894048 A | 7/2015 |
| EP | 3179129 A | 6/2017 |
| EP | 3181937 A | 6/2017 |
| FR | 2466353 A | 4/1981 |

\* cited by examiner

Section A-A

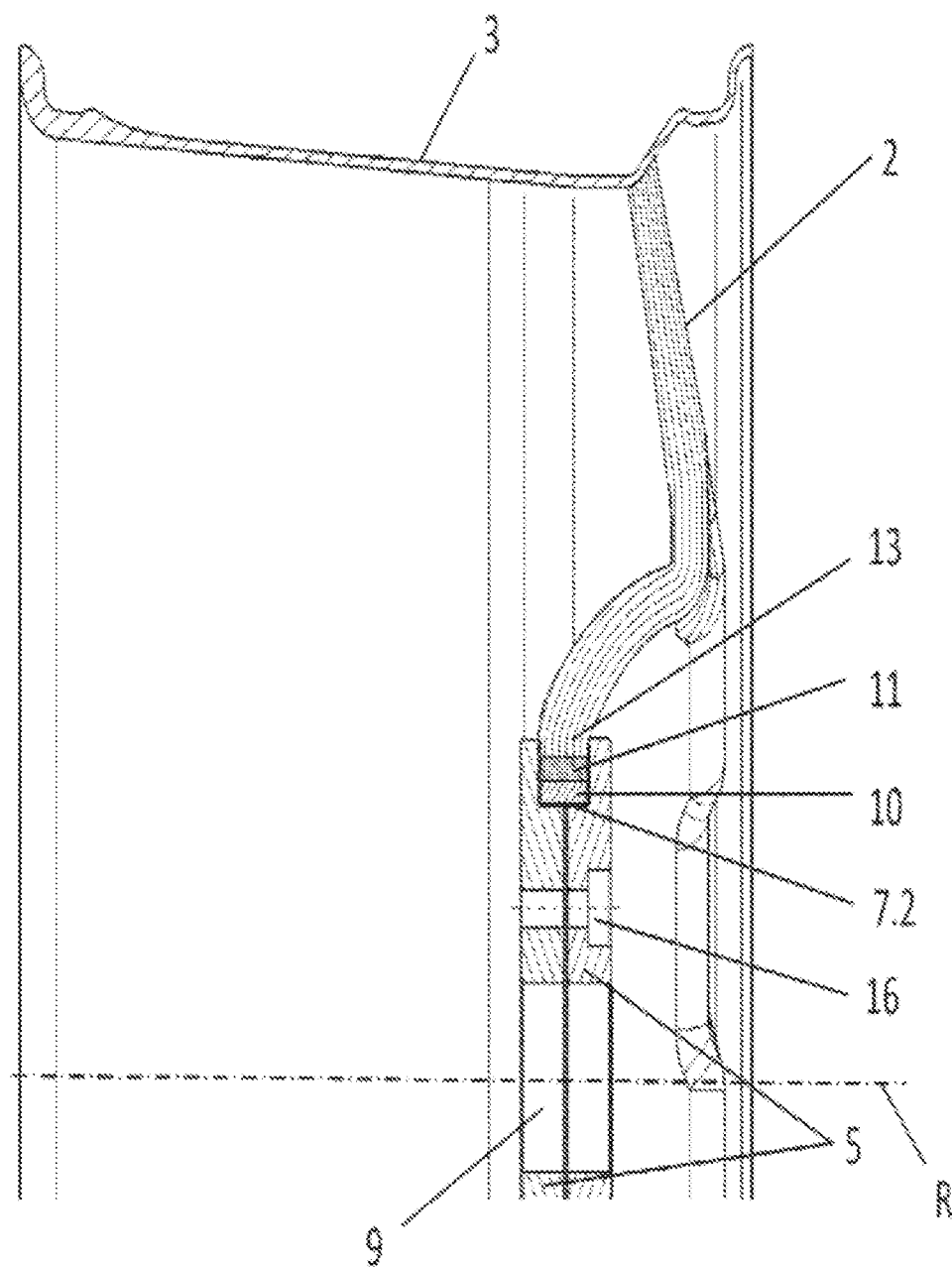

VEHICLE WHEEL ARRANGEMENT AND METHOD FOR PRODUCING A VEHICLE WHEEL ARRANGEMENT

CROSS REFERENCE TO RELATED APPLICATIONS

This application is a U.S. National Stage Entry of International Patent Application Serial Number PCT/DE2018/100917, filed Nov. 12, 2018, which claims priority to German Patent Application No. DE 10 2017 126 636.4, filed Nov. 13, 2017, the entire contents of both of which are incorporated herein by reference.

FIELD

The present disclosure generally relates to vehicle wheels.

BACKGROUND

Vehicle wheel arrangements are known in the case of motor vehicles, in particular in the case of two-wheeled motor vehicles.

By means of carrier elements arranged on one or both sides of the wheel hub, the wheel is mounted for example on a wheel axle or on a drive shaft of a vehicle. The carrier element may furthermore serve for the arrangement of a power-transmitting unit of the vehicle, such as for example a drive unit with sprocket, a brake unit with brake disk or the like, wherein the forces which are transmitted by the power-transmitting unit are transmitted by the carrier element to the wheel, in particular introduced into the wheel hub of the wheel.

The document EP 0174190 A2 has disclosed a motorcycle arrangement which has a wheel composed of metal with a hub portion, with spokes and with a wheel-rim portion and has at least one carrier composed of metal for the seat of the wheel axle, of a brake disk, of a sprocket or the like.

The carrier is connected to the wheel by means of a multiplicity of drive pins which are arranged around the axis of the wheel arrangement and which are driven at both ends into blind bores on the outer circumference of the carrier and around the circumference of the hub portion. The transmission of the torques from the rotational movement of the wheel is realized by means of the form fit and force fit of the drive pins in the carrier and in the hub portion.

The carrier has a short ring-shaped projection with a joining portion which is joined into a joining portion of the central hub opening of the hub portion. This accurately fitting join serves for the fixing of the carrier in the radial direction relative to the hub portion of the wheel.

The carrier is, on both sides of the hub portion, fixed in the axial direction of the wheel axle by means of a through-extending mounting spacer and screwed-in end caps. For the wheel axle seat, the carrier has, at the inner portion, a flange for receiving a ball bearing.

The connection between hub portion and carrier is firstly very complex and expensive to produce, because a multiplicity of connecting parts, drilled holes and holding parts must be manufactured. Furthermore, the bores in the wheel hub and carrier must be formed with high accuracy in order to ensure the seat of the dowel pin connections.

Secondly, the dowel pin connections can transmit only a limited amount of torque, wherein the restricted available structural space in the hub region prevents the use of larger dowel pins or a greater number of dowel pins without subjecting the material of the hub portion to excessive load.

The connection between hub portion and carrier according to the prior art is in particular not suitable in the case of wheel hubs or wheels composed of fiber-reinforced composite, because the connection would not provide sufficient strength in the region of the drilled holes in the fiber-reinforced composite of the wheel hub, and would furthermore give rise to an increased risk of the formation of points of damage on the circumference of the hub portion composed of fiber-reinforced composite. In particular, the drilled holes would give rise to undesired severing of fibers, which would result in a considerable weakening of the fiber-reinforced composite in this mechanically highly loaded region.

Thus a need exists for a vehicle wheel arrangement and a method for the production thereof, which eliminates the disadvantages of the prior art and which is in particular suitable for use in the case of wheel hubs or wheels composed of fiber-reinforced composite.

BRIEF DESCRIPTION OF THE FIGURES

FIG. 10 is a longitudinal sectional view along the wheel hub axis in the section C—C, through the vehicle wheel arrangement of FIG. 8.

DETAILED DESCRIPTION

Figure 1:
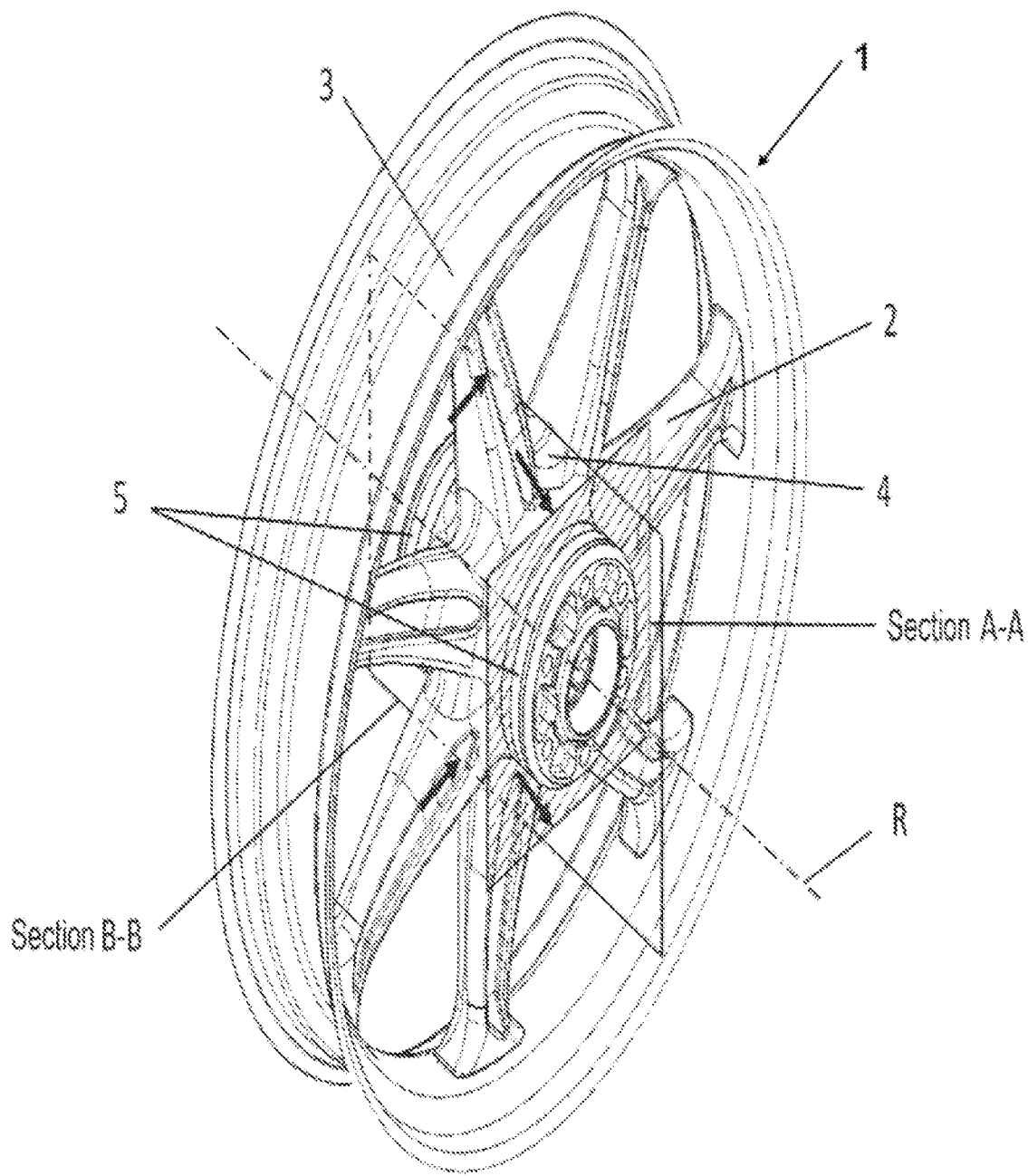
FIG. 1 is an isometric view of an example vehicle wheel arrangement for a motorcycle, having a front wheel and two carrier elements.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims.

In addition, all references to one skilled in the art shall be understood to refer to one having ordinary skill in the art.

The present disclosure generally relates to vehicle wheel arrangements that include a wheel with a wheel hub and a carrier element for the mounting of the wheel on a vehicle part and/or for the arrangement of a power-transmitting unit. The wheel hub may have a joining portion, which in the joined state of the vehicle wheel arrangement corresponds with a joining portion of the carrier element.

In some examples, the surface profiles of the joining portions are designed such that, in the joined state of the vehicle wheel arrangement, the wheel hub and the carrier element are connected to one another in form-fitting fashion at least in the circumferential direction around the wheel hub axis.

If a carrier element is connected to the wheel hub, the respective surface profiles of the joining portion of the wheel hub and of the joining portion of the carrier element make contact with one another; accordingly, the surface profiles of the joining portions are, in accordance with the definition of the invention, those which are formed so as to face toward one another in the joined state of the vehicle wheel arrangement.

The form fit that is formed in the circumferential direction around the wheel hub axis between the wheel hub and the carrier element may be generated by means of a surface profile, which is formed so as to vary in the circumferential direction around the wheel hub axis, of the joining portions of the wheel hub and of the carrier element, such that, for example along an encircling surface profile of the wheel hub and of the carrier element and/or along the circumference of an encircling cross-sectional profile of the wheel hub and of the carrier element, one or more variable protuberances and depressions, with resulting undercuts, are realized, which ensure stable relative-rotation-preventing securing of the carrier element with respect to the wheel hub in the circumferential direction around the wheel hub axis and thus a reliable transmission of the torques and rotational forces from the power-transmitting unit via the carrier element to the wheel during the operation of the vehicle.

The joining portion, which has an encircling surface profile, of the wheel hub may for example be arranged concentrically around a conventionally provided central hub opening of the wheel hub, and the joining portion, which has an encircling cross-sectional profile of the wheel hub, may be arranged for example in the central hub opening of the wheel hub or concentrically around the hub opening.

By means of the surface profiles, which are formed so as to vary over the circumference, of the joining portions of the wheel hub and of the carrier element, it is possible to realize a large-area tangential form-fit connection in the circumferential direction with relatively low surface loading in the contact region of the components to be connected (wheel hub, carrier element), such that, with this embodiment, it is possible for higher torques to be transmitted, with lower punctiform material loading, in relation to the embodiment according to the prior art.

The multiplicity of connecting parts and drilled holes of the connection according to the prior art can hereby be omitted, which furthermore makes the connection according to the invention less expensive.

Advantageous embodiments and refinements of the invention will emerge from the dependent patent claims, from the following description and from the associated drawings.

The embodiment of the connection is suitable in particular, owing to the expedient distribution of the surface load and the associated lower punctiform mechanical and dynamic loading, for the connection of the carrier element to wheel hubs or wheels which have a load-bearing structure composed of fiber-reinforced composite.

The form fit according to the invention is, with a simultaneously higher transmission of force, associated with mechanical protection of the load-bearing structure of the wheel hub composed of fiber-reinforced composite because, by means of the tangential form-fit connection, concentrated relative movements of the carrier element with respect to the wheel hub are substantially prevented, and thus considerably lower frictional wear of the fiber-reinforced composite of the wheel hub is observed.

In one advantageous embodiment of the invention, the at least one joining portion of the wheel hub is formed in a central hub opening of the wheel hub. Here, it is for example possible to utilize the surfaces present on the inside of the central hub opening. In the central hub opening, one continuous joining portion may be formed along the entire passage cross section of the hub opening of a solid-profile wheel hub, or one or two individual joining portions may be formed at the mutually opposite end portions of the interrupted hub opening of a hollow-profile wheel hub.

The joining portion of the carrier element may, correspondingly to this embodiment, be formed on the circumference of a connector piece which can be joined into the hub opening.

Aside from technically expedient practicability of this design, the resulting inside surfaces of the hub opening can be utilized for forming the large-area surface profile of the joining portion(s), and thus provide a large power-transmitting area for the connection between carrier element and wheel.

In one advantageous embodiment of the invention, the at least one joining portion of the wheel hub is formed on a collar flange, extending in the direction of a wheel hub axis, of the wheel hub.

The collar flange of the wheel hub surrounds the central hub opening and extends this in the direction of the wheel hub axis.

The joining portion of the carrier element may be formed, correspondingly to the arrangement of the joining portion on the axially extending collar flange, on a connector piece which can be joined into the collar flange and thus into the hub opening or on a connector piece, which surrounds the collar flange, of the carrier element, wherein the joining portions may in each case alternatively or additionally be formed radially on the inside and/or radially on the outside and/or on the front side of the axially extending collar flange of the wheel hub or of the connector piece of the carrier element.

For example, the surface profile of the joining portion of the wheel hub may be formed radially at the outside on the axially extending collar flange of the wheel hub, and the corresponding surface profile of the joining portion of the carrier element may be formed radially at the inside in a hollow profile of the connector piece of the carrier element.

These embodiments firstly make it possible to utilize an even larger surface for forming the surface profile of the joining portions and thus to provide an even larger power-transmitting area, and secondly permit variable arrangement variants of the connection between the wheel hub and various carrier elements.

Not least, the joining portions are easier to produce on an axially extending collar flange of the wheel hub.

According to a further advantageous embodiment, the encircling surface profiles of the joining portions of the wheel hub and of the carrier element are of stepped or toothed form at least in certain portions in the circumferential direction of the wheel hub axis.

The surface profiles of the joining portions of the wheel hub and of the carrier element have, in the circumferential direction of the wheel hub axis, in each case at least one stepped or toothed protuberance in the surface of the joining portion of the wheel hub or of the carrier element and, corresponding to this, a stepped or toothed recess/hollow in the surface of the joining portion of the carrier element or of the wheel hub respectively, which protuberance and recess/hollow engage into one another.

This simple profile design of the surface of the joining portions generates an adequately secure and thus reliable tangential form fit between the wheel hub or the wheel and the carrier element, with little expenditure for the production of the connection and with low manufacturing costs for the manufacture of the connecting parts.

If, in the circumferential direction of the wheel hub axis, a multiplicity of the combinations of stepped or toothed protuberances and stepped or toothed recesses/hollows are arranged in the joining portions, an expedient distribution of the power transmission and an improvement in the torque transmission are hereby achieved.

The stepped or toothed design of the surface profile of the joining portions preferably continues in alternating fashion over the entire circumference thereof about the wheel hub axis.

In an alternative embodiment, the surface profiles of the joining portions of the wheel hub and of the carrier element are of undulating form at least in certain portions in the circumferential direction of the wheel hub axis.

The surface profiles of the joining portions of the wheel hub and of the carrier element in this case have, in the circumferential direction of the wheel hub axis, in each case at least one undulation elevation in the surface of the joining portion of the wheel hub or of the carrier element and a corresponding undulation hollow in the surface of the joining portion of the carrier element or of the wheel hub, which undulation elevation and undulation hollow engage into one another.

This simple profile design of the surface of the joining portions also generates an adequately secure and thus reliable tangential form fit between the wheel hub or the wheel and the carrier element, with little expenditure for the production of the connection and with low manufacturing costs for the manufacture of the connecting parts.

In particular, the undulation profile generates a particularly continuous cross-sectional transition along the surface profiles of the joining portions, which permits a homogenous, low-stress transmission of power from the carrier element to the wheel hub, and whereby notch stresses in the fiber-reinforced composite are considerably reduced.

If, in the circumferential direction of the wheel hub axis, a multiplicity of the combinations of undulation elevation and undulation hollow are arranged around the circumference of the joining portions, an expedient distribution of the power transmission and an improvement in the torque transmission are achieved in this way also.

The undulating design of the surface profile of the joining portions preferably continues in alternating fashion over the entire circumference thereof about the wheel hub axis.

A structurally expedient and highly effective embodiment provides that the surface profiles of the joining portion of the wheel hub and of the carrier element are designed to be coordinated with one another such that the wheel hub and the carrier element are at least partially connected to one another with an interference fit.

The surface profiles formed in the corresponding joining portions of the wheel hub and of the carrier element are for example provided with such an oversize in relation to one another that, in the connecting region of the carrier element to the wheel hub, an interference fit is generated which gives rise to a preload in the wheel hub and/or in the carrier element and thus a force fit in addition to the form fit.

The additional force-fitting connection between the joining portion of the wheel hub and the joining portion of the carrier element serves for even better securing of the connection, in particular also in an axial and radial direction in relation to the wheel hub axis.

Additional holding parts (such as mounting spacers and end caps according to the prior art) for fixing and securing the carrier element in the direction of the wheel axle are thus rendered unnecessary.

Furthermore, with the combination of form fit and force fit, even higher forces and torques can be transmitted from the power-transmitting unit via the carrier element to the wheel.

In a further advantageous refinement, provision is made whereby the surface profile of the joining portion of the wheel hub and/or the surface profile of the joining portion of the carrier element is/are formed so as to vary in the direction of the wheel hub axis.

The varying surface profile may for example be formed so as to widen in discontinuous or continuous fashion, or narrow in discontinuous or continuous fashion, in the axial direction of the wheel hub axis.

This embodiment fixes the connection between wheel hub and carrier element additionally in the axial direction, and can furthermore give rise to a preload in the wheel hub and/or in the carrier element for an additional force fit, which thus leads to an increase in the security and reliability of the connection.

If the respective surface profile of the joining portion of the wheel hub or of the carrier element is formed so as to widen in continuous fashion or narrow in continuous fashion for example on a circumference in the or around the hub opening of the wheel hub or on an outer or inner circumference of the connector piece of the carrier element, a conically running cross section of the hub opening of the joining portion of the wheel hub, or a conically running cross section of the connector piece of the carrier element, can be created.

This embodiment firstly improves the joining conditions during the production of the connection, in particular owing to the possibility of easier centering of the components to be joined (for example wheel hub with hub opening and connector piece of the carrier element), and can furthermore intensify the effect of a preload for generating an interference fit.

In a further advantageous embodiment, the joining portion of the wheel hub and/or the joining portion of the carrier element has at least one axially acting form-fit element.

Said form-fit element may, as viewed in the direction of the wheel hub axis, be arranged locally within the joining portions of the wheel hub and/or of the carrier element or at the end of the joining portions of the wheel hub and/or of the carrier element, and may be formed so as to extend radially in punctiform fashion, as one or more lugs distributed around the circumference of the wheel hub axis, or so as to extend radially in encircling fashion, for example as a flange.

This additional form-fit element prevents a relative displacement between the joining partners (wheel hub and carrier element) in the direction of the wheel hub axis R, and thus offers additional axial securing of the connection of the joining partners.

If the material of the carrier element has a greater stiffness in relation to the stiffness of the load-bearing structure of the wheel hub composed of fiber-reinforced composite, the above-stated advantages come to bear in a particularly pronounced manner in this combination of the joining partners, and it is possible to create a particularly firm connection between the wheel hub composed of fiber-reinforced composite and the carrier element.

The carrier element is preferably composed of a metallic material which has a greater stiffness than the fiber-reinforced composite of the wheel hub.

This has proven to be particularly advantageous in the case of an interference fit being implemented between the wheel hub composed of fiber-reinforced composite and the higher-strength carrier element. Here, it is for example achieved that, in the case of an interference-fit connection between the joining portions of the wheel hub and of the carrier element, only the fiber-reinforced composite of the wheel hub expands in a directed manner (depending on the embodiment of the carrier element and of the wheel hub). With a targeted arrangement of the fibers adapted to this, the specific characteristics of the fibers or of the fiber-reinforced composite with regard to the elongation capability and preload action can be utilized to the benefit of the connection strength.

In a particularly preferred embodiment, the wheel hub has, in the region of the joining portion, fiber plies with fibers arranged unidirectionally in the circumferential direction of the wheel hub axis.

Here, in the region of a wheel hub with a load-bearing structure composed of fiber-reinforced composite, additional fiber plies (so-called UD fiber plies) are used which comprise or are composed of fibers, such as for example carbon fibers, arranged unidirectionally in the circumferential direction around the wheel hub axis. Said fiber plies are laid in the manner of a bandage around a load-bearing structure composed of fiber-reinforced composite of the wheel hub. For example, said fiber plies may surround the load-bearing structure of the wheel hub opening and preferably encompass an encircling surface profile of the joining portion of the wheel hub.

This has likewise proven particularly advantageous in the case of an interference fit being implemented between the wheel hub composed of fiber-reinforced composite and the higher-strength carrier element.

During, for example, the pressing of a connector piece of the carrier element into the hub opening of the wheel hub, the joining portion, surrounding the hub opening, of the wheel hub expands, wherein the UD fiber plies encompassing the hub opening are elongated, generating a defined tensile stress. The elongation of the UD fiber plies is permanently maintained owing to the unidirectional orientation and the high strength of the fibers in the longitudinal extent thereof.

A defined particularly high and permanent preload is thus realized in the material of the wheel hub, which makes the connection between the carrier element and the wheel hub or the vehicle wheel even more secure and reliable.

At the same time, by means of this design of the vehicle wheel arrangement, all forces and torques arising around and in the direction of the wheel hub axis can be reliably transmitted from the power-transmitting unit via the carrier element to the wheel hub and thus to the vehicle wheel, and vice versa.

If the UD fiber plies extend in the direction of the wheel hub axis over the entire region of the joining portion of the wheel hub, it is furthermore possible to generate a particularly uniform preload in the wheel hub.

If, according to a further advantageous design, the surface profile of the joining portion of the wheel hub is formed by at least one material ply which is excluded from the load-bearing structure of the fiber-reinforced composite, it is possible for pressing forces acting locally on the surface profile during the pressing-in of the carrier element to be accommodated by one or more material plies (sacrificial plies) which do not perform any direct load-bearing function for the wheel or the wheel hub and which are "sacrificed" for the realization of the form-fitting and force-fitting connection, such that possible damage to the underlying load-bearing fiber plies of the fiber-reinforced composite can be avoided, and thus the load-bearing structure of the fiber-reinforced composite of the wheel hub remains protected against impairment of its load-bearing characteristics.

For example, the surface profile of the joining portion of the wheel hub may be formed by at least one ply composed of glass-fiber-reinforced plastic, which is separate from the load-bearing structure of the fiber-reinforced composite of the wheel hub.

The use of such material plies (sacrificial plies) in the surface profile of the joining portion of the wheel hub serves for realizing separate mechanical protection of the surface profile of the joining portion of the wheel hub, for example during the pressing process for producing an interference fit between the carrier element and the wheel hub.

In the case of a combination of the joining partners in which the wheel hub is formed from carbon-fiber-reinforced plastic and the carrier element is of metallic form, a surface profile formed from glass fiber plies in particular furthermore generates advantageous galvanic isolation between the carrier element and the wheel hub, such that material-damaging corrosion phenomena can be substantially prevented.

In order to increase the reliability of the galvanic protection of the wheel hub, the metallic carrier element may preferably be coated for example by hard anodizing or anodizing.

In a further advantageous embodiment of the invention, the load-bearing structure has, in the region of the joining portion of the wheel hub composed of fiber-reinforced composite, one or more plies composed of glass-fiber-reinforced plastic.

The glass fibers or glass fiber plies integrated into the load-bearing structure in the implementation of a wheel hub with a load-bearing structure composed of fiber-reinforced composite in the region of their joining portion make it possible, owing to their particular strength, for even higher torques and lateral forces to be transmitted.

To achieve even higher friction coefficients in the connection between the joining partners, provision is made whereby the wheel hub and the carrier element are connected in the region of the joining portions by means of an adhesive, composed preferably of high-strength plastic.

In the combination of form fit and/or force fit and/or cohesion, it is possible for even higher forces and torques to be transmitted via the connection of the carrier element to the wheel hub on the vehicle wheel.

The adhesive, which is of viscous form prior to curing, may furthermore, owing to the (still) low friction, facilitate the pressing process in the case of a pressed connection of the carrier element to the wheel hub.

In the case of the embodiment of a wheel hub composed of fiber-reinforced composite, the adhesive is preferably designed to be capable of creep, such that the adhesive, prior to curing, fills microporous that are present in the fiber-reinforced plastic of the joining portion of the wheel hub. This serves for further increasing the friction coefficients between the specific joining partners (carrier element, wheel hub).

In one alternative embodiment, the wheel hub and the carrier element are connected in the region of the joining portions by means of a curable matrix material of the fiber-reinforced composite of the wheel hub, which may be realized for example in the case of a common molding and infiltration process of the joining partners.

In this embodiment, the retroactive joining of the separately manufactured wheel hub or of the separately manufactured vehicle wheel to the carrier element is eliminated. The connection of the joining partners occurs during the manufacture of the wheel hub or of the vehicle wheel by infiltration and consolidation (curing) of the fiber-reinforced composite.

The cohesive bond by means of the matrix material can achieve the same advantages with regard to the transmission of the forces and torques via the connection of the carrier element to the wheel hub.

In one advantageous embodiment of the adhesively bonded or consolidated joining partners, the adhesive or the matrix material has a thickening at a contour in the transition of the connected joining portions of the carrier element and of the joining portion of the wheel hub.

Said thickening, which may for example be in the form of a bead along a connection contour, serves for minimizing notch effects, which notch effects may be caused by stress elevations owing to the stiffness transition in the material of the connected joining partners which are subjected to mechanical load by driving operation, and which notch effects could impair the material of the joining partners, in particular the fiber-reinforced composite of the wheel hub.

Said notch effects may arise for example at a discontinuous, abrupt contour transition, formed owing to the connection, between the joining partners and in particular in the case of joining partners with different stiffness, such as for example in the case of the wheel hub composed of fiber-reinforced composite in conjunction with a carrier element composed of metal.

Such a risk of material impairment of the wheel hub can be counteracted in an effective manner by means of a thickened overlying ply of the adhesive or of the matrix material at this contour transition.

The object of providing a method for producing a vehicle wheel arrangement according to the invention having a wheel hub composed of fiber-reinforced composite is advantageously achieved by means of the features and method steps of method claim 16 and furthermore by means of combinations with the features and method steps of the method claims which refer back to method claim 16.

In the method, the initially separately prefabricated joining partners (vehicle wheel or wheel hub of the vehicle wheel, and carrier element) are subsequently joined to one another or into one another in form-fitting fashion in the direction of the wheel hub axis.

The vehicle wheel or the wheel hub of the vehicle wheel composed of fiber-reinforced composite is prefabricated with at least one joining portion which, in the joined state of the vehicle arrangement, is intended to correspond with the joining portion of at least one carrier element.

During the prefabrication of the wheel hub, the surface profile of the joining portion of the wheel hub is formed or milled into a material ply, which is provided as a sacrificial ply, of the wheel hub. Said material ply may for example be a glass-fiber-reinforced plastics layer. Thus, the load-bearing structure of the fiber-reinforced composite is maintained in the region of the joining portion of the wheel hub and is not weakened as a result of the surface profile being formed in or milled in. A glass-fiber-reinforced plastics layer furthermore offers a protection and isolation function against contact corrosion between the wheel hub and the carrier element.

For the realization of additional securing of the connection of the wheel hub to the carrier element by means of a form fit in the axial direction of the wheel hub axis, a joining portion of the wheel hub and/or a joining portion of the carrier element may be formed with an axially acting form-fit element which prevents a relative displacement of the wheel hub and of the carrier element with respect to one another. The form-fit element may for example be provided at one end of the joining portion, which is expedient in particular for the process of joining prefabricated joining partners to or into one another.

For the realization of additional securing of the connection of the wheel hub to the carrier element by means of a force fit, the first or the second surface profile may, at least in certain portions, be formed with an oversize in relation to the second or the first surface profile respectively, such that, during the joining of the surface profiles of the corresponding joining portions into one another, an interference fit is generated at least partially between the wheel hub and the carrier element. Here, the fiber-reinforced composite may be expanded in the region of the joining portion of the wheel hub, which increases the stress in the structure of the fiber-reinforced composite, ensuring an intense force fit.

One or more fiber plies (UD plies) with fibers arranged unidirectionally in the circumferential direction of the wheel hub axis may be applied or inlaid in the region of the joining portion of the wheel hub. Said fibers bandage the joining portion of the wheel hub in order to increase the strength of the wheel hub in said region.

If the fiber-reinforced composite is expanded in the region of the joining portion of the wheel hub owing to an interference fit between the wheel hub and the carrier element, the UD plies can, within their elongation limit, generate a permanent preload, for example in the form of a compressive stress, and thus ensure a particularly reliable and permanent connection between the wheel hub and the carrier element.

For the realization of additional securing of the connection of the wheel hub to the carrier element by means of cohesion, it may be provided that, prior to the joining of the wheel hub to the carrier element, the first and/or the second surface profile of the corresponding joining portions are coated with a suitable, curable adhesive. The adhesive that is situated in this case between the wheel hub and the carrier element can increase the friction coefficient between the joining partners and additionally offer protection against corrosion.

An excess quantity of the adhesive which emerges during the joining of the wheel hub to the carrier element, in particular during the joining of the surface profiles of the corresponding joining portions to or into one another, can be formed and cured as a bead along a contour transition of the connected joining partners.

For example, a certain excess quantity of the adhesive that is displaced along the wheel hub axis during the joining of the surface profiles to or into one another may emerge at the end of the corresponding joining portions, and forms—in the cured state—a bead along a contour transition of the connected joining partners, which bead gives rise to a continuous transition of the change in stiffness between the carrier element and the wheel hub composed of fiber-reinforced composite and thus reduces the notch effect in said region.

As an alternative to the above-described method as claimed in claim 16, the connection between the wheel hub and the carrier element for the purposes of producing the vehicle wheel arrangement according to the invention may also be performed in a common molding and infiltration process, wherein, for example, dry fiber plies or fiber plies impregnated with curable matrix material are, in order to form the wheel hub or the vehicle wheel, laid using different fiber laying methods directly on a joining portion of the carrier element prefabricated with the desired surface profile, wherein the joining portion of the wheel hub is generated with the correspondingly form-fitting surface profile, the formed fiber semifinished product of the wheel hub is possibly infiltrated with curable matrix material, and the fiber semifinished product of the wheel hub is consolidated (cured) together with the connected carrier element such that a form-fitting and cohesive connection between the wheel hub and the carrier element is generated in one integral manufacturing process.

The surface profile of the joining portion of the wheel hub is molded directly in contact with the surface profile of the carrier element, which in this case serves as a molding tool, whereby, to the benefit of maintaining the strength of the fiber-reinforced composite, milling of the fiber plies of the wheel hub, in the case of which fibers are inevitably severed, is eliminated.

The fiber semifinished product applied to the contoured surface profile of the carrier element ensures, already during the preforming process, an effective form fit which prevents the joining partners from rotating or slipping relative to one another.

Here, furthermore, the process of retroactively joining a prefabricated wheel hub or a prefabricated vehicle wheel to the carrier element is also eliminated, and in particular, retroactive pressing-together of the joining partners is also eliminated.

The method features as claimed in claims 17, 19 and 21 may analogously also be applied in the case of this method.

These and further features which emerge from the patent claims, from the description of the exemplary embodiments and from the drawings may be realized in each case individually or in combination as advantageous embodiments of the invention, for which protection is claimed here.

FIGS. 1 to 7 show an example of a vehicle wheel arrangement according to the invention for a motorcycle, composed of a front wheel 1 of the motorcycle and two carrier elements 5.

At the same time, below, a preferred method for producing the vehicle wheel arrangement according to the invention will be described with regard to FIGS. 1-7.

The front wheel 1 as per FIG. 1 is made up of a wheel center member 2 with a wheel hub 4 and with a wheel rim 3, and is composed of fiber-reinforced composite (FRC) such as for example carbon-fiber-reinforced plastic (CFRP). The two carrier elements 5 are arranged to both sides of the wheel hub 4 and can each receive a brake disk of a brake unit (not illustrated). The two carrier elements 5 are composed of a metallic material.

The brake unit represents one of the possible power-transmitting units that can be connected by means of the carrier elements 5 to the vehicle wheel 1. In the case of a vehicle wheel arrangement (not illustrated here) for a rear wheel of a motorcycle, it is for example possible for one of the two carrier elements to receive a brake disk of the brake unit and for the other carrier element to receive a drive unit.

Figure 2:
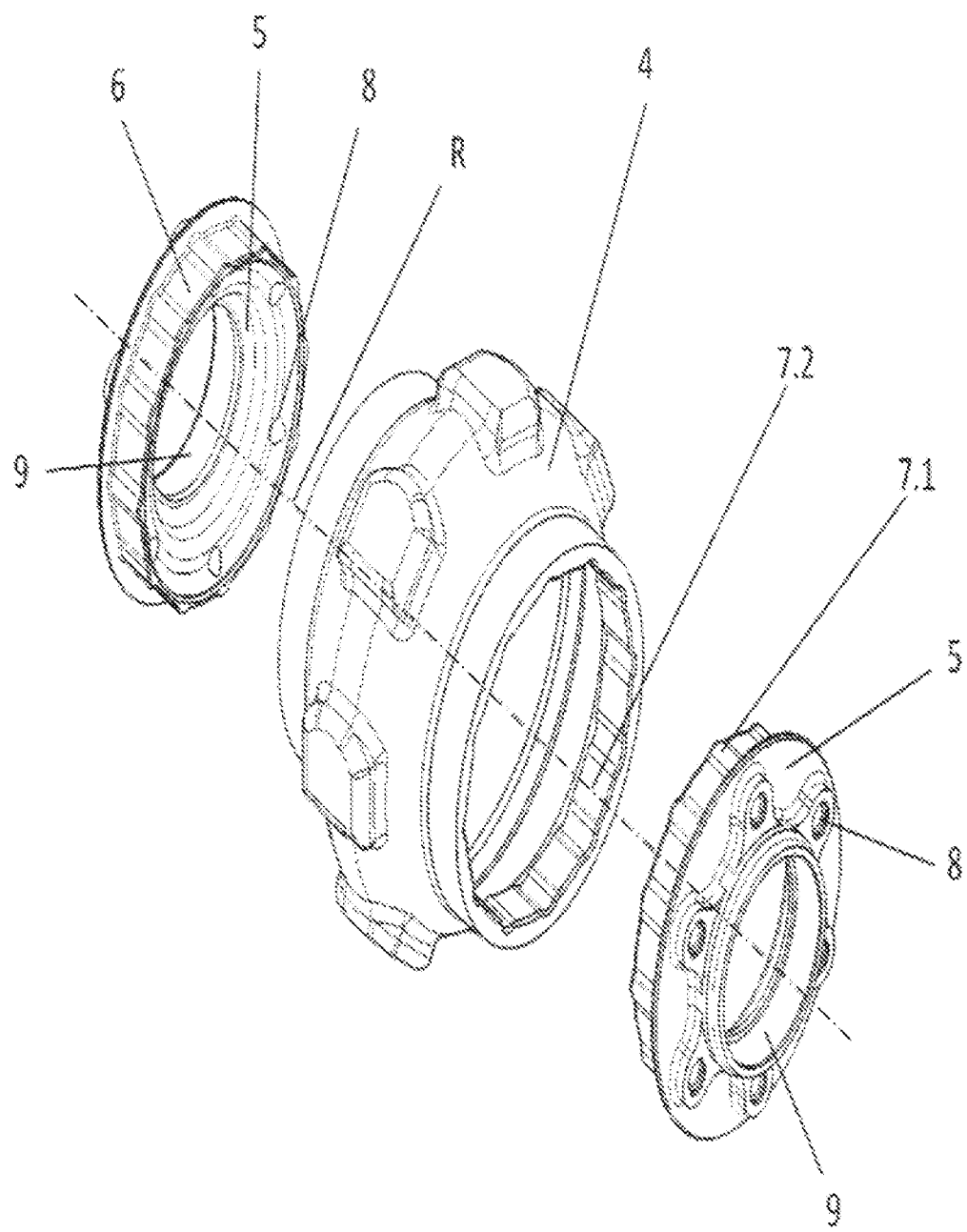
FIG. 2 is an exploded view of a detail of the vehicle wheel arrangement of FIG. 1 in a region of a wheel hub.

FIG. 2 shows, in an exploded illustration of the vehicle wheel arrangement according to the invention, an enlarged detail of the front wheel 1 as per FIG. 1 in the region of the wheel hub 4, with the two carrier elements 5 illustrated separately in a pre-assembly state.

For the sake of clarity, of the front wheel 1, only the wheel hub 4 with the initial portions of the spokes of the wheel center member 2 is illustrated.

The metallic carrier elements 5 are each formed in the manner of a bushing, which bushings have, facing toward the wheel hub 4, a hollow cylindrical connector piece in the axial extent of the wheel hub axis R, on the outer circumference of which connector piece an encircling joining portion 6 is formed in each case.

At an end of the connector piece averted from the wheel hub 4, the carrier element 5 is formed with a disk-shaped bearing flange. The bearing flange has a central opening 9 with a bearing seat 9 for the mounting of the carrier element 5 on a wheel axle (not illustrated here).

Around the circumference of the opening 9 of the bearing flange of the carrier element 5, there are provided multiple (in the exemplary embodiment six) threaded bores 8 which extend all the way through the hollow cylindrical connector piece of the carrier element 5 and which serves for the fastening of the brake disk (not illustrated).

The brake disk is seated on an outer circumference of the bearing seat 9 of the bearing flange and lies areally against a contact surface, formed so as to be reduced in mass by the threaded bores 8, of the bearing flange.

In radial extent, the bearing flange of the carrier element 5 has a collar flange 14 which projects beyond the connector piece. The function of said collar flange is discussed in more detail with regard to FIGS. 5 and 7.

The wheel hub 4 has, to both sides in the axial extent of the wheel hub axis R, in each case one collar flange which in each case surrounds a central hub opening and on the inside of which there is formed in each case one encircling joining portion 6. The surface profile 7 of the joining portion 6 of each of the carrier elements 5 has undulation elevations (7.1) which are arranged so as to be distributed around the circumference and which correspond in a form-fitting manner with the undulation hollows 7.2 arranged so as to be distributed around the circumference of the joining portion 6 of the wheel hub 4.

Figure 3:
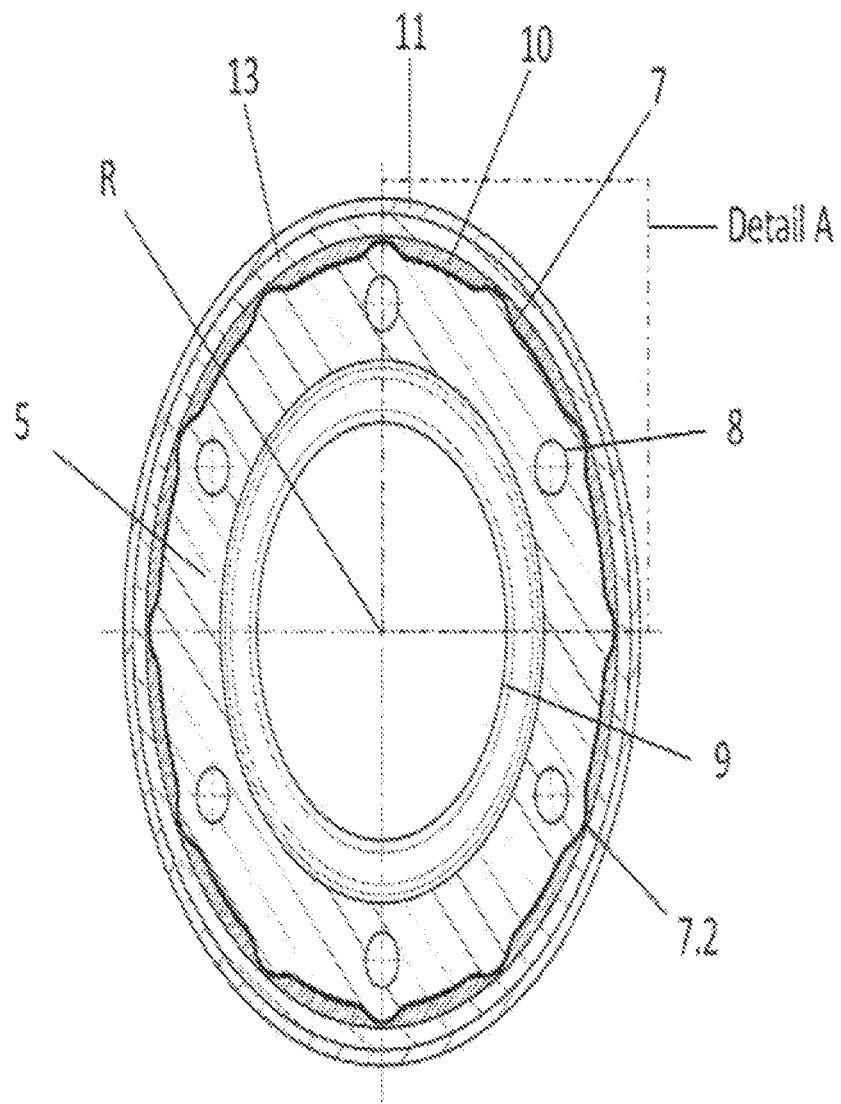
FIG. 3 is a cross-sectional view transverse to a wheel hub axis in the section A—A, through a connecting point between the wheel hub and a carrier element according to FIGS. 1 and 2.
Figure 4:
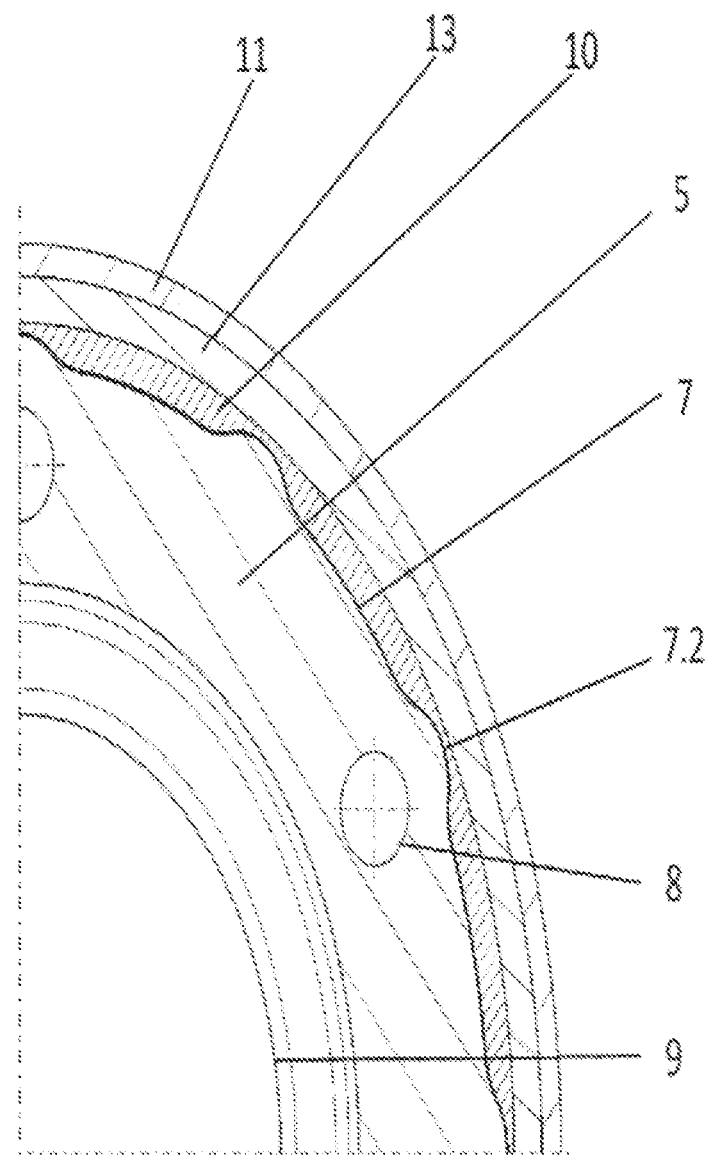
FIG. 4 is a detail view A from the cross-sectional view of FIG. 3.

The surface profile 7.2 on the inner wall of the collar flange of the wheel hub 4 is formed in a special reinforced material ply 10, composed in this case of glass-fiber-reinforced plastic (GFRP), which cover, at the inner wall, the fiber laminate plies 13 of the load-bearing structure of the fiber-reinforced composite of the wheel hub 4 composed of CFRP (see FIGS. 3 and 4).

The collar flange of the wheel hub 4 furthermore has a number of fiber plies which surround the circumference of the CFRP fiber plies 13 of the load-bearing structure of the collar flange in the manner of a bandage and which are composed of unidirectional fibers 11 (UD fiber bandage) (see FIGS. 3 and 4).

The joining partners of form-fitting design (wheel hub 4 and the carrier elements 5) are, in the exemplary embodiment, connected to one another by means of an interference fit.

The joining portion 6 on the connector piece of the respective carrier elements 5 is, for this purpose, designed such that its surface profile 7.1 has a slight radial oversize in relation to the surface profile 7.2 of the joining portion 6 on the collar flange of the wheel hub 4.

The oversize of the surface profile 7.1 of the joining portion 6 of the carrier elements 5 may furthermore, in order to facilitate the assembly process, be designed to rise along the wheel hub axis R in the direction of the bearing flange, such that the connector piece of the carrier element 5 is of slightly conical form in the axial direction.

The connector piece, designed in this way, of the carrier element 5 is pressed with a form and force fit into the collar flange, which is of correspondingly matching design—with a radial undersize, of the wheel hub 4 (see FIGS. 3 and 4).

Under a preload generated in this way in the collar flange of the wheel hub 4, the carrier element 5 is permanently fixedly seated in the wheel hub 4 composed of CFRP, without the CFRP material of the wheel hub 4 being subjected to unfavorable mechanical loading both by the pressing-in of the connector piece of the carrier element 5 and during driving operation of the vehicle wheel 1.

In the joined state of the vehicle wheel arrangement, high forces and torques can be transmitted reliably and with high operational safety from the brake unit via both carrier elements 5 to the wheel hub 4 and thus to the vehicle wheel 1.

Additionally, with a suitable adhesive, additional cohesion can be generated which serves for increasing the friction coefficients between the two joining partners (wheel hub 4, carrier element 5) and by means of which a transmission of even higher forces and torques can be achieved in the combination of form fit, force fit and cohesion.

FIG. 3 shows a sectional view perpendicular to the wheel hub axis R in the region of the connecting point between a carrier element 5 and the wheel hub 4 as per FIGS. 1 and 2 in the connected state.

FIG. 4 shows an enlarged detail view A from the sectional view as per FIG. 3.

These sectional views show a cross section of the metallic connector piece of the carrier element 5 in its pressed-in arrangement in the cross section of the collar flange of the wheel hub 4 composed of CFRP.

It is also possible to see the threaded bores 8 which lead through the hollow cylindrical body of the carrier element 5 and which serve for the fastening of the brake disk to the carrier element 5.

Figure 7:
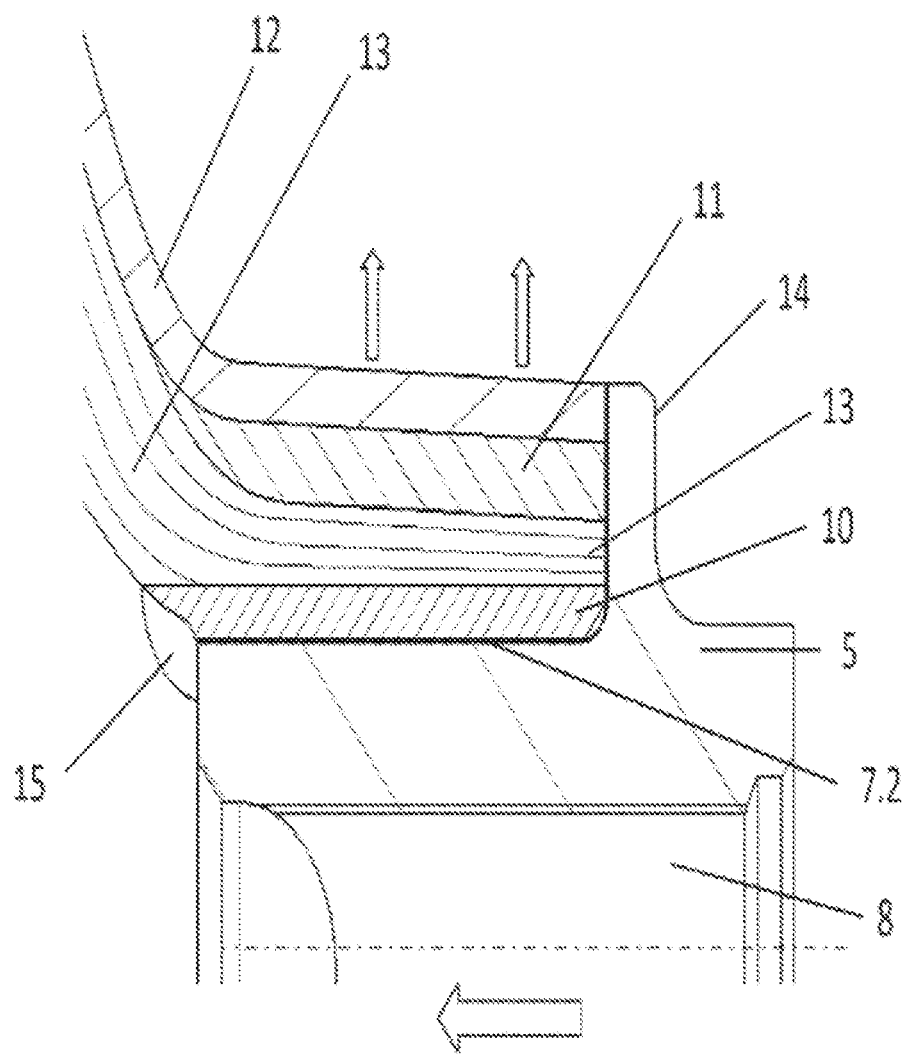
FIG. 7 is a detail view B from the longitudinal sectional view of FIG. 6.

The collar flange of the wheel hub 4 composed of CFRP has a multi-ply fiber laminate as load-bearing structure 13, wherein the ends of the CFRP fiber plies 13 of the spokes of the wheel center member 2 end in the core of the collar flange (cf. FIG. 7).

The undulating profile 7 of the connector piece of the carrier element 5 has a total of twelve undulation elevations 7.1, which correspond in a form-fitting manner with a corresponding twelve undulation hollows 7.2 of the undulation profile 7 of the collar flange of the wheel hub 4, which undulation hollows are milled into the GFRP plies 10 of the collar flange.

The undulation elevations 7.1 give rise, in the circumferential direction of the connector piece, to corresponding undercuts which are filled by the correspondingly processed GFRP plies 10 of the collar flange of the wheel hub 4. By means of the undulation hollows 7.2 formed on the collar flanges, the two carrier elements 5 can be aligned with respect to one another and, in the joined state, form the form fit that acts in the circumferential direction around the wheel hub axis R.

The undulation hollows 7.2 of the surface profile 7 of the collar flange of the wheel hub 4 are formed exclusively in the GFRP fiber plies 10, such that the CFRP fiber plies 13 of the load-bearing structure of the wheel hub 4 remain unaffected. The GFRP fiber plies 10 are thus, as so-called sacrificial plies, sacrificed for the benefit of maintaining the strength of the load-bearing structure 13 of the wheel hub 4.

The high strength of the GFRP plies 10 firstly makes it possible for particularly high forces and torques to be transmitted, and secondly serves as protection for the contact surfaces, which are subjected to increased mechanical load during the process of the connector piece of the metallic carrier element 5 being joined/pressed into the collar flange of the wheel hub 4, of the surface profile 7.2 of the joining portion 6 of the wheel hub 4 composed of CFRP, and furthermore for the galvanic separation of the wheel hub 4 composed of CFRP with respect to the metallic carrier element 5.

As a result of the connector piece of the carrier element 5 being joined/pressed into the collar flange of the wheel hub 4, the collar flange of the wheel hub 4 is subjected to an interference fit between the undulation profile 7.1, which is formed with an oversize, of the connector piece of the carrier element 5 and the undulation profile 7.2 of the collar flange, which interference fit is associated with a certain radially directed expansion of the collar flange (corresponding to the arrows in FIG. 7).

This process takes place on both sides of the wheel hub 4 in a continuous and slow manner in the direction of the wheel hub axis R, such that the collar flanges of the wheel hub 4 expand in the radial direction in a uniform and gradual manner and the required preload in the form-fitting and force-fitting connection of the joining partners (4, 5) is realized.

For the build-up or for the increase of the preload generated in the collar flange owing to the radial expansion of the collar flange of the wheel hub, the outer circumference of the collar flange of the wheel hub 4 is wound in the circumferential direction of the collar flange around the wheel hub axis R with unidirectionally oriented CFRP fiber plies 11, which form a fixed bandage around the collar flange (UD fiber bandage).

Said UD fiber bandage 11 accommodates the preload as a tensile stress in the fibers wound around the circumference of the collar flange, which fibers can compensate said tensile stress in a particularly effective manner. The unidirectionally oriented fibers 11 in the circumferential direction around the wheel hub axis R ensure a durable preload for permanently securing the connection between the carrier element 5 and the wheel hub 4 both during the joining/pressing-in of the connection and during vehicle operation.

Figure 5:
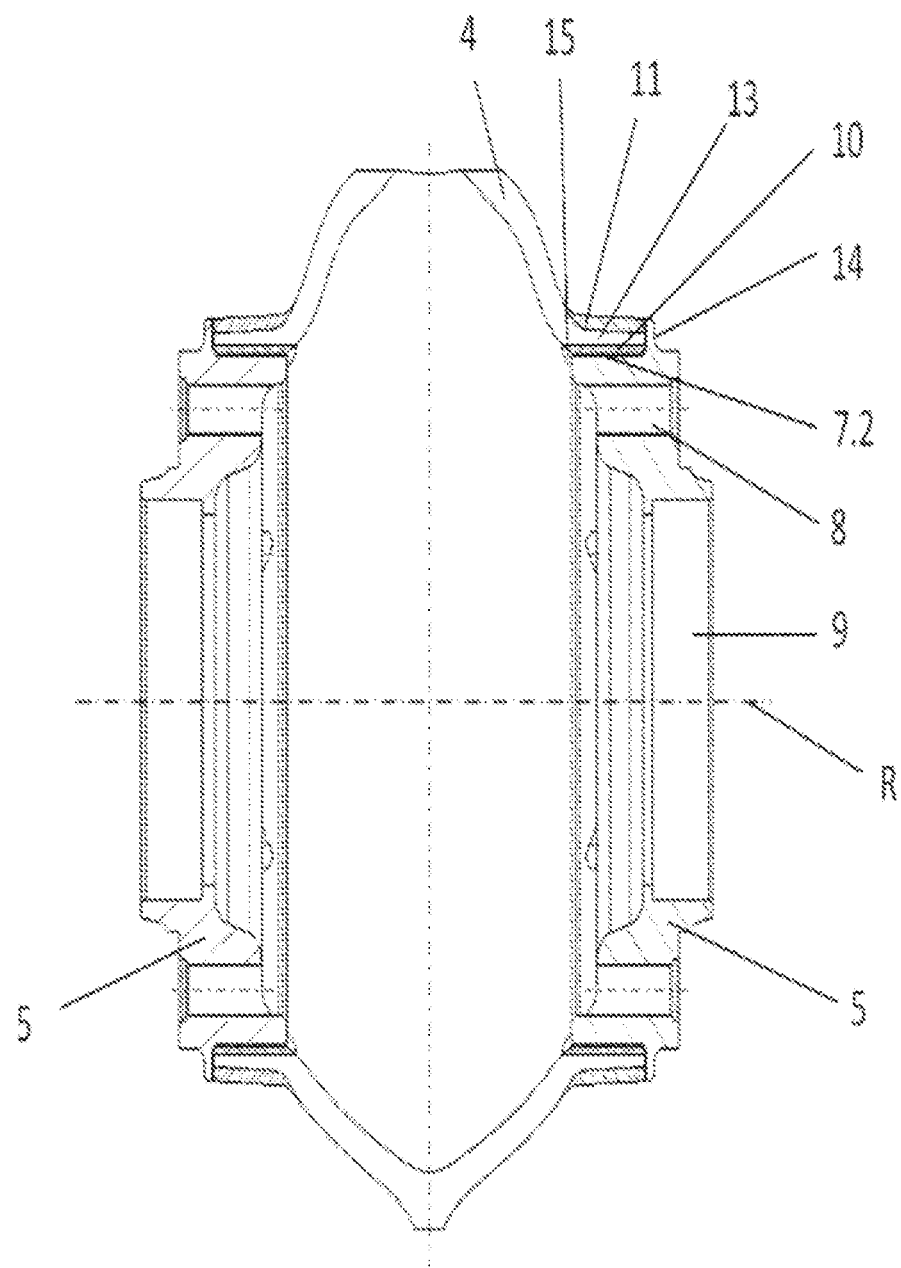
FIG. 5 is a longitudinal sectional view along the wheel hub axis in the section B—B, through a detail of the vehicle wheel arrangement of FIG. 1.

FIG. 5 shows a longitudinal section B-B through a detail of the vehicle wheel arrangement as per FIG. 1 along the wheel hub axis R. For the sake of clarity, of the front wheel 1, only the wheel hub 4 with the initial portions of the spokes of the wheel center member 2 is illustrated.

The two carrier elements 5 are seated firmly in the two collar flanges to both sides of the wheel hub 4 by way of the interference fit.

FIG. 5 shows the course of the load-bearing CFRP fiber plies (13) from the spokes of the wheel center member 2 at the transition into the collar flanges of the wheel hub 4, wherein, in the region of the collar flanges, the CFRP load-bearing structure 13 is covered on the inside by the GFRP fiber plies 10 and is enclosed on the outer side by the unidirectional CFRP fiber plies 11 (UD bandages) wound around the CFRP load-bearing structure 13 of the collar flange.

The longitudinal section runs in each case through two of the twelve undulation elevations 7.1 of the undulation profile 7 of the connector piece of the carrier element 5 and simultaneously through two of the twelve undulation hollows 7.2 of the undulation profile 7 of the collar flange of the wheel hub 4. In the region of the undulation hollows 7.2 of the collar flange, it is possible to see a small but still-present thickness of the ply structure of the milled-out GFRP fiber plies 10.

The detailed laminate ply structure of the collar flange of the wheel hub 4 can be seen even more clearly from the detail view B as per FIG. 7.

FIG. 5 and FIG. 7 show that the GFRP fiber plies 10 and the fiber plies 11 wound as a UD fiber bandage extend in the axial direction of the wheel hub axis R over the entire longitudinally extending region of the collar flange.

It can also be clearly seen from FIGS. 5 and 7 how the collar flange 14 of the carrier element serves as form-fit element 14 for the exact axial positioning of the carrier element 5 relative to the collar flange of the wheel hub 4 in the direction of the wheel hub axis R, without the need for further joining or connecting elements.

The adhesive used in the exemplary embodiment for producing additional cohesion may preferably run between the collar flange of the wheel hub 4 and the connector piece of the carrier element 5 in the direction of the wheel hub axis R into the interior of the wheel hub 4 and, after curing, remain in the form of a thin bead 15 at the transition between the end of the joining portion 6 at the connector piece of the carrier element 5 and the end of the joining portion 6 at the collar flange of the wheel hub 4 (see also FIG. 7).

This adhesive bead 15 serves for minimizing the notch effect at the transition between the wheel hub 4 composed of fiber-reinforced composite and the carrier element 5 composed of metal.

Figure 6:
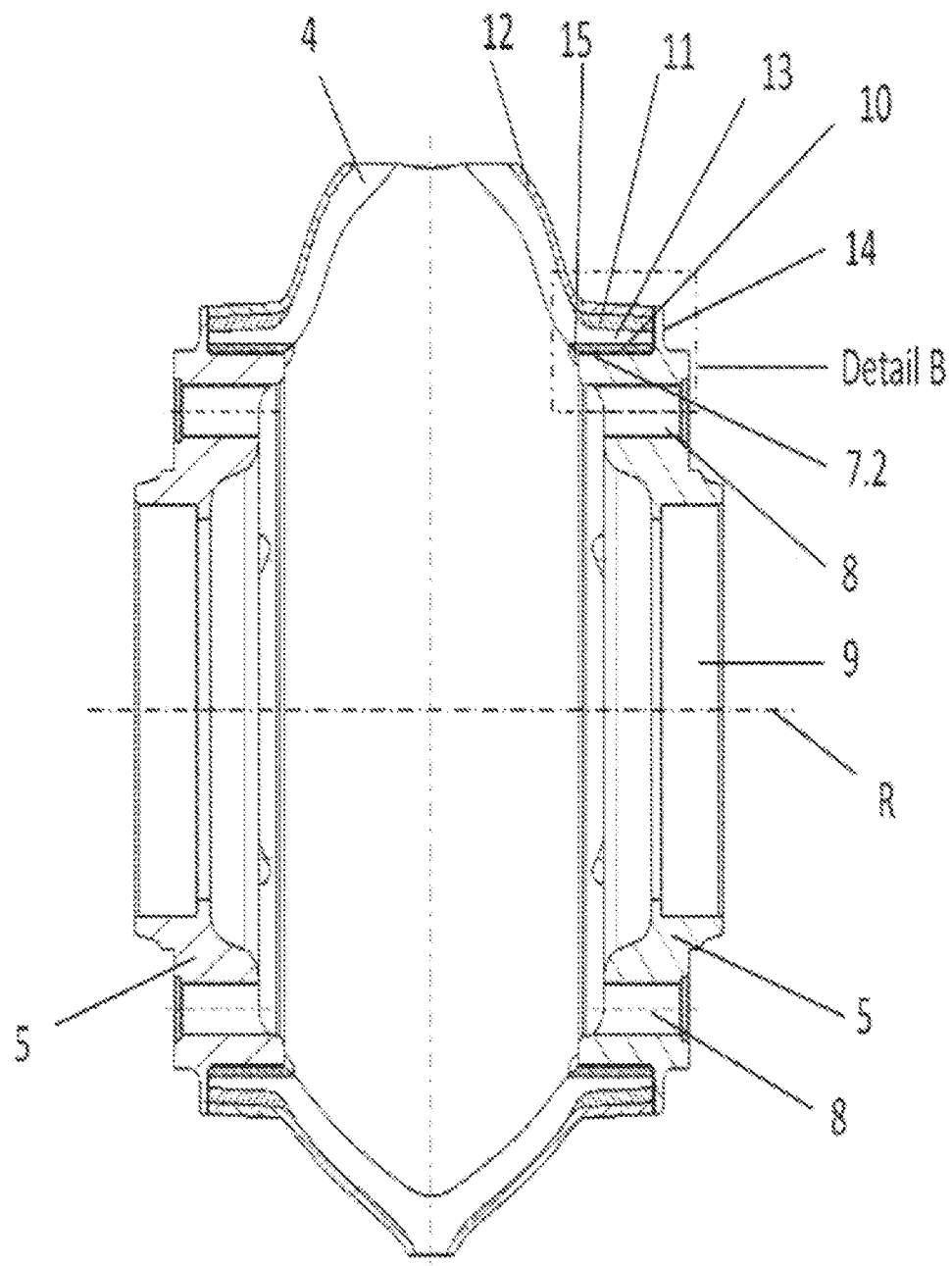
FIG. 6 is a longitudinal sectional view along the wheel hub axis, through a detail of the vehicle wheel arrangement of FIG. 1, with an alternative ply structure.

The longitudinal section as per FIG. 6 shows a layer structure of the wheel hub 4 enhanced in relation to the embodiment as per FIG. 5.

The layer structure of the wheel hub 4 as per FIG. 6 is of analogous design in principle to FIG. 5, but has an additional top ply 12 which partially or completely surrounds the wheel hub 4. For example, the wheel hub 4 may be surrounded on both sides by in each case one top ply 12, which top plies extend around the collar flanges of the wheel hub 4 as far as into the spoke region of the wheel center member 2 and are brought together between the spokes. Set top ply 12, composed for example of a tinted CFRP fiber layer, may serve inter alia for visual design purposes and/or as protection for the underlying laminate plies (fiber plies of the load-bearing structure 13, UD fiber bandage 11).

FIG. 7 shows the connecting point of the wheel hub 4 to the carrier elements 5 as per FIG. 6 in an enlarged detail view B, from which it is possible to see the basic laminate ply structure of the collar flange of the wheel hub 4 as per FIG. 5, in particular the laminate ply structure, enhanced to include the top ply 12, of the collar flange of the wheel hub 4 as per FIG. 6.

From the detailed view as per FIG. 7, it is possible to see inter alia the course of the CFRP fiber plies 13 running out from the spokes of the wheel center member 2, the ends of which CFRP fiber plies, diverted into the axial direction of the wheel hub axis R in the region of the collar flange, form the load-bearing structure 13 of the collar flange of the wheel hub 4.

By contrast, the UD bandages 11 run in the circumferential direction of the wheel hub axis R around the CFRP fiber plies 13 running out from the spokes.

Of the GFRP fiber plies 10 arranged on the inside, there remains, in the region of the milled-in undulation hollows 7.2, a thin layer (at least 0.1 mm) of the glass fiber plies 10 for the purposes of being able to utilize the particular strength of said material ply 10 in relation to the CFRP fiber plies of the load-bearing structure 13 for the form fit, and for the purposes of ensuring a fully areal galvanic separation of the wheel hub 4 composed of CFRP with respect to the metallic carrier element 5.

The connector piece of each carrier element 5 is inserted axially into the collar flange of the wheel hub 4 to such an extent that the vertical contact surface of the collar flange 14, as axial form-fit element 14 of the carrier element 5, lies and is pressed against the face surface, which is preferably likewise milled flat, of the collar flange of the wheel hub 4.

Figure 8:
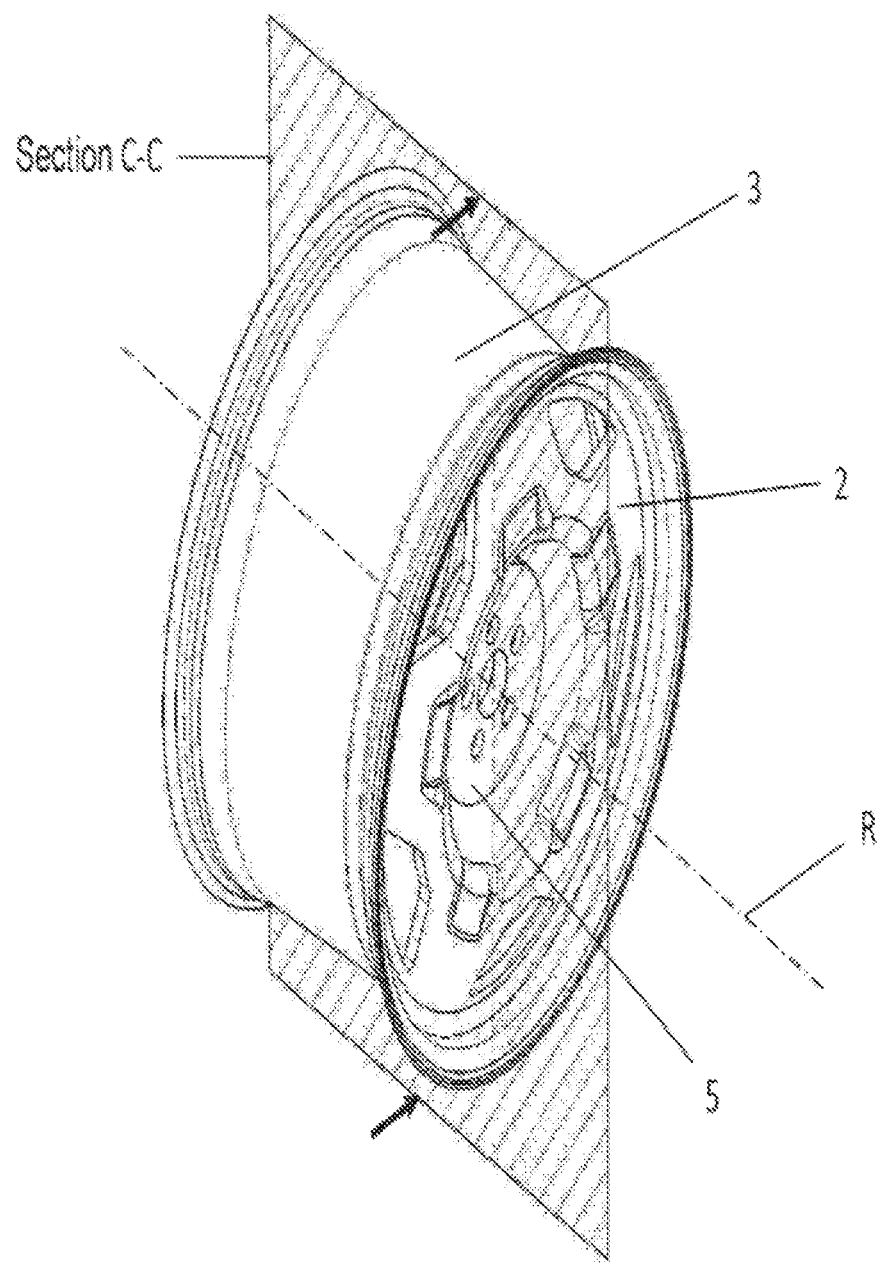
FIG. 8 is an isometric view of an example vehicle wheel arrangement for a passenger motor vehicle wheel having a front wheel and two carrier elements.

FIG. 8 shows a vehicle wheel arrangement for a passenger motor vehicle wheel, composed of a passenger motor vehicle front wheel 1 and two carrier elements 5.

In the isometric illustration as per FIG. 8, only one carrier element 5 is visible. The passenger motor vehicle front wheel 1 has a wheel center member 2 with wheel hub 4 and has a wheel rim 3 and is composed of fiber-reinforced composite (FRC), for example of carbon-fiber-reinforced plastic (CFRP). The two carrier elements 5 are composed of a metallic material.

Substantially only the differences in relation to the exemplary embodiment as per FIGS. 1 to 7 will be discussed below. Features, characteristics and advantages of this exemplary embodiment which are not explicitly described correspond to the description in the exemplary embodiment as per FIGS. 1 to 7.

Figure 9:
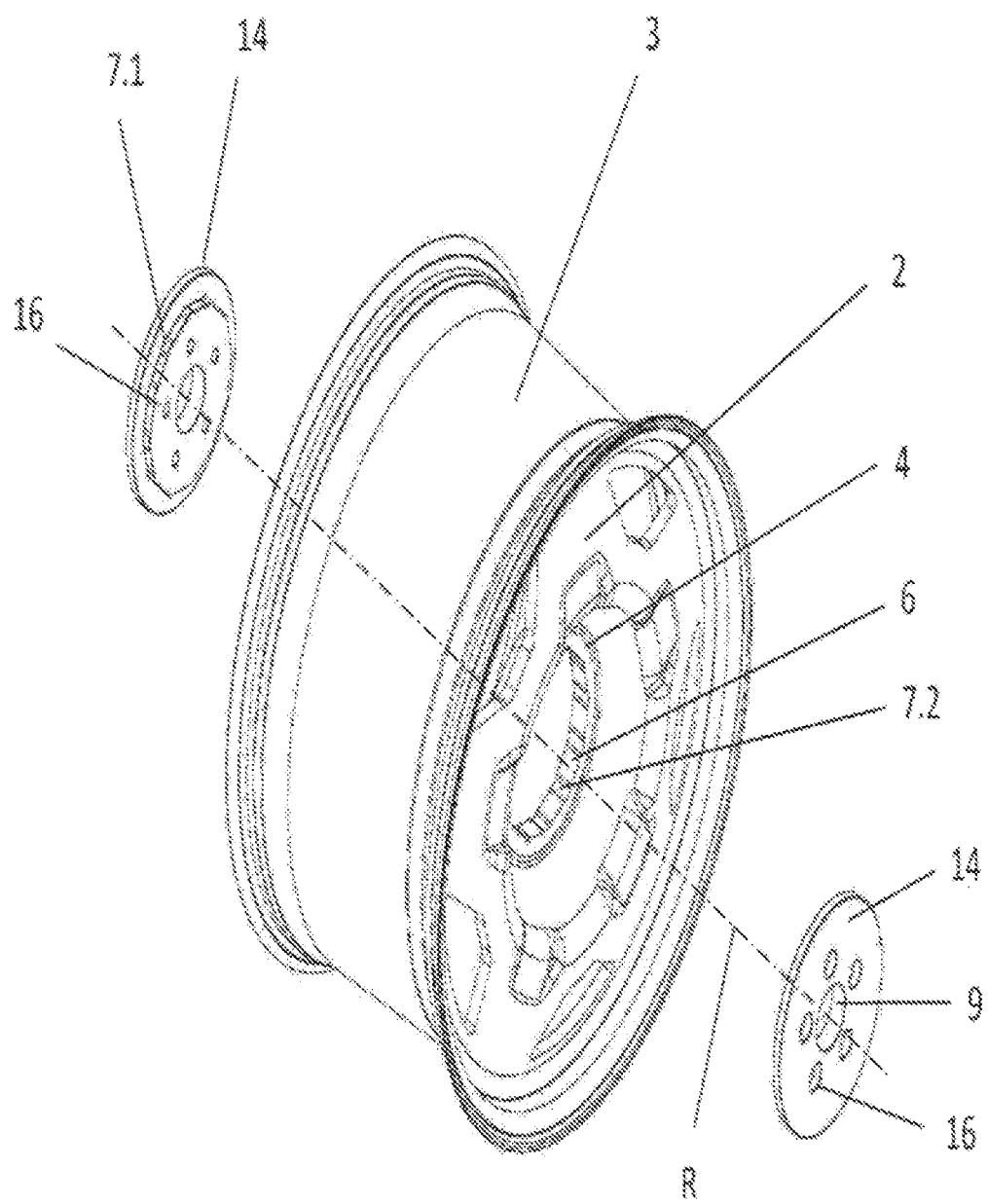
FIG. 9 is an exploded view of the vehicle wheel arrangement of FIG. 8.

FIG. 9 shows, in an exploded illustration of the vehicle wheel arrangement according to the invention, the passenger motor vehicle front wheel 1 as per FIG. 8 with the two separately illustrated carrier elements 5 in the pre-assembly state. By means of the carrier elements 5, the passenger motor vehicle front wheel 1 is received on a wheel carrier which is connected to a drive shaft of the passenger motor vehicle (not illustrated). In this exemplary embodiment, the wheel carrier and drive shaft constitute the power-transmitting unit.

The two carrier elements 5 are, in the assembled state, arranged to both sides of the wheel hub 4, wherein in each case one radially extending collar flange 14 of each carrier element 5, as axial form-fit element, encompasses the encircling edge of the central hub opening of the wheel hub 4 to both sides, and an axially extending connector piece of each carrier element 5 projects into the hub opening, as can be seen in particular from FIG. 10.

FIG. 10 shows a longitudinal section C-C through the vehicle wheel arrangement as per FIG. 8 along the wheel hub axis R.

In the region of the hub opening, the connector pieces of the two carrier elements 5 are situated opposite one another, wherein—delimited axially by the respective collar flange 14—a minimal remaining gap is still defined between the connector pieces, such that the carrier elements 5 do not make contact. It is thus ensured that the carrier elements 5 lie fully areally and exclusively against the fiber composite material of the wheel hub 4. It is however primarily achieved in this way that a "double fit" of the connection, on the one hand between the respective carrier element 5 and the wheel hub and on the other hand between the carrier elements 5, is avoided. Additional contact of the carrier elements 5 with one another may, specifically during dynamic operation of the vehicle wheel 1, lead to overdeterminacy of the fit locations, which would adversely affect the stability of the connection between wheel hub 4 and carrier element 5.

The two carrier elements 5 have in each case one ring of holes 16 with five passage bores 16 arranged so as to be distributed around the circumference of the opening with the bearing seat 9, which passage bores, in the assembled state, are arranged congruently with respect to one another and serve for the leadthrough of the wheel bolts (not shown) through the two carrier elements 5, such that the wheel bolts can be screwed into the wheel carrier (not shown) for the purposes of fastening the passenger motor vehicle front wheel 1 to the passenger motor vehicle.

Formed on the inside of the hub opening of the wheel hub 4 is an encircling joining portion 6, the surface profile 7 of which has an undulating profile 7 with undulation hollows 7.2 arranged so as to be distributed around the circumference.

Formed correspondingly with respect thereto with a form fit, on the outer circumference of the axially extending connector piece of the carrier elements 5, there is in each case one encircling joining portion 6, the surface profile 7 of which has an undulating profile 7 with undulation elevations (7.1) arranged so as to be distributed around the circumference.

The wheel center member 2 has, as load-bearing structure, a multi-ply CFRP fiber laminate 13, wherein the CFRP fiber plies 13 end in the region of the wheel hub 4 in the direction of the hub opening (clearly visible in FIG. 10).

The CFRP fiber plies 13 of the wheel hub 4 are, at the end in the region of the hub opening, formed so as to run in encircling fashion in the circumferential direction of the wheel hub axis R and so as to extend axially along the wheel hub axis R over the full area of the joining portion 6 of the wheel hub 4, and are likewise lined with unidirectional CFRP fiber plies 11 (UD fiber bandage).

The surface profile 7 on the inner wall of the joining portion 6 of the wheel hub 4 in the hub opening is formed in the GFRP fiber plies 10 applied separately for the purposes of profile reinforcement, into which GFRP fiber plies the undulating profile 7 (undulation hollows 7.2) of the joining portion 6 of the wheel hub 4 is milled (cf. FIG. 10).

The surface profile 7 of the joining portion 6 on the connector piece of the carrier elements 5 has in each case a slight oversize in relation to the surface profile 7 of the joining portion 6 of the wheel hub 4 in the hub opening.

The connector pieces of the carrier elements 5 are, for the purposes of generating a combined form fit and interference fit between the wheel hub 4 and the carrier elements 5, pressed on both sides in the direction of the wheel hub axis R into the hub opening in form-fitting and force-fitting fashion.

Under the preload generated by the interference fit and the associated expansion of the hub opening, which is compensated in an effective manner by the tensile stress in the UD bandage plies 11, the carrier elements 5 even in this embodiment according to the invention of the passenger motor vehicle front wheel 1 composed of CFRP are seated permanently firmly in the wheel hub 4 without the CFRP material of the wheel hub 4 being subjected to unfavorable mechanical loading both as a result of the pressing-in of the connector pieces of the carrier element 5 and during driving operation of the vehicle wheel 1.

In the joined state of this vehicle wheel arrangement, it is thus likewise possible for high forces and torques to be transmitted reliably and with high operational safety from the drive shaft via the carrier elements 5 to the wheel hub 4 and thus to the vehicle wheel 1.

Additionally, with a suitable adhesive, cohesion can be generated, whereby a transmission of even higher forces and torques can be achieved in the combination of form fit, force fit and cohesion.

LIST OF REFERENCE DESIGNATIONS

1 Wheel, motorcycle front wheel, passenger motor vehicle front wheel
2 Wheel disk, wheel center member
3 Wheel rim
4 Wheel hub
5 Carrier element
6 Joining portion
7 Surface profile, undulating profile, undulation elevation .1, undulation hollow .2
8 Threaded bores
9 Opening with bearing seat
10 Material ply, sacrificial ply, CFRP fiber plies
11 Unidirectional fibers, UD fiber bandage
12 Top ply
13 CFRP fiber plies, load-bearing structure
14 Collar flange, axial form-fit element
15 Thickening, bead
16 Ring of holes with passage bores
R—Wheel hub axis

What is claimed is:

1. A vehicle wheel arrangement comprising:
a wheel with a wheel hub; and
a carrier element for mounting the wheel on a vehicle part and/or for arrangement of a power-transmitting unit,
wherein in a joined state of the vehicle wheel arrangement a joining portion of the wheel hub corresponds with a joining portion of the carrier element,
wherein surface profiles of the joining portions are configured such that in the joined state of the vehicle wheel arrangement, the wheel hub and the carrier element are connected to one another in form-fitting fashion at least in a circumferential direction of a wheel hub axis, and
wherein the wheel hub includes in a region of the joining portion, one or more fiber plies with fibers arranged unidirectionally in the circumferential direction of the wheel hub axis.

2. The vehicle wheel arrangement of claim 1 wherein the wheel hub includes a load-bearing structure comprised of fiber-reinforced composite.

3. The vehicle wheel arrangement of claim 2 wherein a material of the carrier element has a greater stiffness than the fiber-reinforced composite of the load-bearing structure of the wheel hub.

4. The vehicle wheel arrangement of claim 2 wherein the surface profile of the joining portion of the wheel hub comprises a material ply or sacrificial ply that is separate from the load-bearing structure of the fiber-reinforced composite of the wheel hub.

5. The vehicle wheel arrangement of claim 2 wherein the load-bearing Structure includes in a region of the joining portion of the wheel hub, a ply comprised of glass-fiber-reinforced plastic.

6. The vehicle wheel arrangement of claim 2 wherein the wheel hub and the carrier element are connected in a region of the joining portions by way of an adhesive and/or by way of a curable matrix material of the fiber-reinforced composite.

7. The vehicle wheel arrangement of claim 6 wherein the adhesive or the matrix material includes a thickened area at a contour in a transition of the connected joining portions.

8. The vehicle wheel arrangement of claim 1 wherein the joining portion of the wheel hub is located in a central hub opening of the wheel hub.

9. The vehicle wheel arrangement of claim 1 wherein the joining portion of the wheel hub is located on a collar flange, extending in a direction of the wheel hub axis, of the wheel hub.

10. The vehicle wheel arrangement of claim 1 wherein the surface profiles have a stepped form or a toothed form at least in portions in the circumferential direction of the wheel hub axis.

11. The vehicle wheel arrangement of claim 1 wherein the surface profiles have an undulating form at least in portions in the circumferential direction of the wheel hub axis.

12. The vehicle wheel arrangement of claim 1 wherein the surface profiles are configured to coordinate with one another such that the wheel hub and the carrier element are at least partially connected by an interference fit.

13. The vehicle wheel arrangement of claim 1 wherein at least one of the surface profiles varies in the circumferential direction of the wheel hub axis.

14. The vehicle wheel arrangement of claim 1 wherein at least one of the joining portions includes an axially acting form-fit element.

15. A method for producing a vehicle wheel arrangement that includes a wheel hub comprised of fiber-reinforced composite and a carrier element for mounting the vehicle wheel on a vehicle part and/or for arrangement of a power-transmitting unit, the method comprising:
  prefabricating the wheel hub or the vehicle wheel from fiber-reinforced composite with a joining portion, which in a joined states of the vehicle wheel arrangement corresponds with a joining portion of the carrier element to be joined to the wheel hub, wherein the joining portion of the wheel hub is formed with a material ply that is predetermined as a sacrificial ply with respect to a load-bearing structure of the fiber-reinforced composite of the wheel hub;
  forming or milling a first surface profile into the joining portion of the wheel hub, wherein the first surface profile is formed or milled into the sacrificial ply of the wheel hub;
  forming or milling a second surface profile into the joining portion of the carrier element, the second surface profile being configurable in a form-fitting manner with respect to the first surface profile at least in a circumferential direction of a wheel hub axis; and
  joining the first and second surface profiles of the joining portions to or into one another in a form-fitting fashion in the circumferential direction of the wheel hub axis.

16. The method of claim 15 comprising forming an axially acting form-fit element on the joining portion of at least one of the wheel hub or the carrier element.

17. The method of claim 15 wherein the first or second surface profile is formed so as to be oversized relative to the other of the first or second surface profile such that during joining of the surface profiles an interference fit is generated at least partially between the wheel hub and the carrier element.

18. The method of claim 15 wherein one or more fiber plies with fibers arranged unidirectionally in the circumferential direction of the wheel hub axis are applied or inlaid in a region of the joining portion of the wheel hub.

19. The method of claim 15 wherein prior to joining the wheel hub to the carrier element, at least one of the first or second surface profile is at least partially coated with a curable adhesive for cohesive bonding.

20. The method of claim 19 wherein an excess of the curable adhesive that emerges while joining the wheel hub to the carrier element is formed and cured as thickened area along a contour transition of a connection between the wheel hub and the carrier element.

* * * * *